US006625450B1

(12) United States Patent
Munoz-Garcia et al.

(10) Patent No.: US 6,625,450 B1
(45) Date of Patent: Sep. 23, 2003

(54) SATELLITE COMMUNICATIONS GATEWAY MANAGEMENT SYSTEM

(75) Inventors: Samuel G. Munoz-Garcia, London (GB); Patrick Chomet, London (GB); Dennis Roy Mullins, London (GB)

(73) Assignee: International Mobile Satellite Organization, London (GB)

( * ) Notice: Subject to any disclaimer, the term of this patent is extended or adjusted under 35 U.S.C. 154(b) by 929 days.

(21) Appl. No.: 08/915,597

(22) Filed: Aug. 21, 1997

(30) Foreign Application Priority Data

Aug. 24, 1996 (GB) .............................................. 9617773

(51) Int. Cl.[7] ................................................ H04Q 7/20
(52) U.S. Cl. ........................ 455/430; 455/427; 455/11.1
(58) Field of Search ................................. 455/429, 427, 455/428, 430, 11.1, 12.1, 13.1, 13.2, 432, 422, 435, 436, 434, 440, 507, 445, 456, 517, FOR 100; 342/357.07, 357.01, 457; 701/207

(56) References Cited

U.S. PATENT DOCUMENTS 5,355,511 A  * 10/1994 Hatano et al. .............. 455/11.1
5,481,592 A     1/1996 Azer
5,561,836 A  * 10/1996 Sowles et al. .............. 455/428
6,064,858 A     5/2000 Maatman et al.

FOREIGN PATENT DOCUMENTS

| EP | 0 536 921 A1 | 4/1993 |
| EP | 0 663 736 A1 | 7/1995 |
| EP | 0 834 224 B1 | 9/2000 |
| GB | 2 281 014 A | 2/1995 |
| GB | 2 295 296 A | 5/1996 |
| WO | WO 96/16488 | 5/1996 |

* cited by examiner

Primary Examiner—Dwayne Bost
Assistant Examiner—James K Moore
(74) Attorney, Agent, or Firm—McDermott, Will & Emery

(57) ABSTRACT

A method and apparatus are disclosed for a system where a user terminal 11 can communicate with satellites 9A–C, the satellites 9A–C can communicate with earth stations 7A–E which in turn can communicate with the terrestrial telephone system 1. The user terminal can register with one of the earth stations 5C which has an associated mobile satellite switching center 5C which acts as a gateway into the terrestrial system 1. When attempting to contact the user terminal 11 from the terrestrial system 1 the mobile satellite switching center 5C of visitor registration, if it cannot make the contact itself, instructs other earth stations 5, 7, in turn, according to different methods of alternative earth station 7 selection, until contact is made, and then routes all voice messages 21 through itself 5C to retain the single and original gateway into the terrestrial system 1.

12 Claims, 3 Drawing Sheets

SATELLITE COMMUNICATIONS GATEWAY MANAGEMENT SYSTEM

FIELD OF THE INVENTION

This invention relates to a telecommunication system where remote user terminals are in receipt of access to a larger telecommunication system by means of direct access to a satellite which, in turn, is in communication with a ground station. It particularly relates to a system where, potentially, a user terminal can access more than one satellite and, via a satellite or satellites, can access more than one ground station.

BACKGROUND

First, it is necessary to describe the general terrestrial telephone system. This is the "larger telecommunication system" mentioned above.

The terrestrial telephone system comprises the sum of all of the wire, optical, point-to-point, microwave and any other means of conducting signals from one point to another via the surface of the earth, together with their associated switches, amplifiers, encoders, decoders, amplifiers and repeaters. On a national level, the network links all access points in a country. Country is linked to country via international trunk lines. Oceans are spanned by submarine cables. The terrestrial network is a transparent carrier where a signal may be introduced from an access point and routed to another, selected access point elsewhere on the surface of the earth. A subscriber can access the terrestrial system via various gateways. For example, the terrestrial system can be accessed from the public switched telephone network, a public switched data network, an integrated switched digital network, a cellular telephone system, or a satellite telephone system. Each gateway provides a plurality of different access points, which, depending upon the gateway, can range from a simple telephone to a complex data or image source. The subscriber's gateway, at the subscriber's request, commands the terrestrial system to route and carry the message from the subscriber to a selected destination. The message comes in through the subscriber's gateway, passes through the terrestrial system, and exits through the selected destination gateway to reach the access point required. Once the message path is established, two-way communication can commence. This is the way the terrestrial system works. Each gateway is connected to another single gateway. The terrestrial system is not adapted, readily, to switch, during the course of a message, between different source gateways or between different destination gateways.

Each gateway, in what is generally understood to be a telephone system, provides a plurality of access points whereby a subscriber may make or receive calls. Each access point is unique in its identity or location and definitely is unique to its particular gateway. In other words, one access point means one gateway.

Now, satellite systems provide a gateway to the terrestrial system via earth stations, capable of establishing two way contact with a satellite or satellites. In turn, the satellites can communicate with user terminals (portable handsets). The user terminals are thus put in contact with the earth stations which can act as a gateway to the terrestrial system.

Sadly, each earth station is a separate gateway. Generally, the earth stations are widely spread apart. There is envisaged an earth station density of one, two or just a few earth stations on each continent. Thus, in general, each user terminal will see satellites which are visible only to one earth station. This satisfies the terrestrial network requirement "one access point means just one gateway." This situation is not a problem. However, there are circumstances, for example, in the middle of the Pacific ocean, in the middle of the Sahara desert, high atop the Andes, where a user terminal may be able to see a satellite or satellites which, in turn, are visible to more than one earth station. This now breaks the rule "one access point means just one gateway". The user terminal is an access point. Each earth station is a gateway. Now there is the situation "one access point-many gateways". The terrestrial network is not adapted to respond to multiple gateways. Further, the signals to and from the earth station, satellites and user terminals are forever changing. What was a perfectly good satellite link a moment ago is no longer functional because the satellite has moved, the user terminal has been shielded by a building or other structure, and a host of other reasons. However, one of the other user terminal to satellite to ground station links might still work. How can the switch between ground stations be effected without confusing the operation of the terrestrial network? The present invention seeks to solve the twin problem of multiple gateway access and operational gateway switching at minimal cost and with least disruption to the general functionality of the terrestrial network.

SUMMARY OF THE INVENTION

According to a first aspect, the present invention consists in a communication system wherein a user terminal can communicate with a plurality of satellites; wherein each of said plurality of satellites can communicate with a plurality of earth stations; wherein each of said plurality of earth stations is operable to provide a gateway into a terrestrial system; and wherein said user terminal is registered at a selected one of said plurality of earth stations as its gateway station; said system being characterised by said gateway station, in the event of being unable to establish contact with said user terminal, being operative to select and instruct another earth station to establish contact with said user terminal to act as an alternative earth station and being further operative to pass messages to and from said user terminal through said alternative earth station while acting as said gateway into said terrestrial system.

The present invention further provides a communication system wherein said gateway earth station is operative to employ a low capacity data link to instruct said alternative earth station to attempt to establish contact with said user terminal and, in the event of said alternative earth station establishing contact with said user terminal, is operative thereafter to employ a high capacity voice link to pass messages to and to receive messages from said alternative earth station.

The present invention further provides a communication system wherein said gateway earth station is operative to recall the last known geographical location of said user terminal and is further operative to select, as said alternative earth station, that earth station most likely to establish contact with a user terminal at said last known geographical location.

The present invention further provides a communication system wherein said gateway earth station is operative to recall and employ a plurality of timed previous geographical locations for said user terminal to estimate the instant position of said user terminal and is further operative to select, as said alternative earth station, that earth station most likely to establish contact with said user terminal at said estimated instant position.

The present invention still further provides a communication system wherein said gateway earth station, in the event of being incapable of establishing contact with said user terminal, is operative to select in turn, as said alternative earth station, each of those earth stations which are geographically most proximate to said gateway earth station until an alternative earth station is found capable of establishing contact with said user terminal.

The present invention still further provides a communication system wherein said gateway earth station is operative to execute a calculation to determine whether or not said gateway earth station is capable of establishing contact with said user terminal and to select said another earth station as said alternative earth station if and only if said calculation indicates that said gateway earth station is incapable of establishing contact with said user terminal.

According to a second aspect, the present invention consists in a method for establishing communication with a user terminal for use in a communication system wherein a user terminal can communicate with a plurality of satellites; wherein each of said plurality of satellites can communicate with a plurality of earth stations; wherein each of said plurality of earth stations is operable to provide a gateway into a terrestrial system; and wherein said user terminal is registered at a selected one of said plurality of earth stations as its gateway station; said method comprising the steps of said gateway station, in the event of being unable to establish contact with said user terminal, selecting and instructing another earth station to establish contact with said user terminal to act as an alternative earth station and said gateway station passing messages to and from said user terminal through said alternative earth station while acting as said gateway into said terrestrial system.

The second aspect of the present invention further provides a method including the steps of said gateway earth station employing a low capacity data link to instruct said alternative earth station to attempt to establish contact with said user terminal and, in the event of said alternative earth station establishing contact with said user terminal, employing thereafter a high capacity voice link to pass messages to and to receive messages from said alternative earth station.

The second aspect of the present invention still further provides a method including the steps of said gateway earth station recalling the last known geographical location of said user terminal and selecting, as said alternative earth station, that earth station most likely to establish contact with a user terminal at said last known geographical location.

The second aspect of the present invention yet further provides a method including the steps of said gateway earth station recalling and employing a plurality of timed previous geographical locations for said user terminal to estimate the instant position of said user terminal and, thereafter, selecting, as said alternative earth station, that earth station most likely to establish contact with said user terminal at said estimated instant position.

The second aspect of the present invention yet further provides a method including the steps of said gateway earth station, in the event of being incapable of establishing contact with said user terminal, selecting, in turn, as said alternative earth station, each of those earth stations which are geographically most proximate to said gateway earth station until an alternative earth station is found capable of establishing contact with said user terminal.

The second aspect of the present invention further provides a method including the steps of said gateway earth station executing a calculation to determine whether or not said gateway earth station is capable of establishing contact with said user terminal, and selecting said another earth station as said alternative earth station if and only if said calculation indicates that said gateway earth station is incapable of establishing contact with said user terminal.

In a preferred embodiment, a plurality of earth stations are each uniquely connected to and controlled by a respective mobile satellite switching centre, the mobile satellite switching centre acting as a gateway into the terrestrial telephone system. The user terminal is preferably provided in the form of a portable telephone handset, capable of sending radio signals to and receiving radio signals from any one of a plurality of satellites, but equally could be a dedicated ship, aircraft, land vehicle or manually portable device. The satellites are preferably in a constellation comprising ten satellites in each of two orthogonal orbits, each orbit being at 45 degrees to the equator of the earth, and each at a height of 10,500 km above the surface of the earth, but equally could be in any configuration capable of presenting access to one or more satellites at a time to the user terminal and of presenting one or more satellites at a time to an earth station for contact to be made between at least one satellite and one earth station. Each mobile satellite switching centre preferably contains a visitor register whereat the user terminal can register as a visitor so that the terrestrial system, when originating a call to the user terminal, can consult a home register which holds details of at which mobile satellite switching centre the user terminal is registered as a visitor, so to route telephone calls directly to that mobile satellite switching centre whereat the user terminal is registered as a visitor.

Each earth station is capable of passing commands to all the other earth stations and of receiving responses back, preferably by means of a low capacity data link, but equally by any means exhibiting the necessary characteristics. The mobile satellite switching centres are provided with means to send voice messages between each other, preferably by means of a dedicated voice grade link, but alternatively by any other means capable of so sending and receiving voice messages.

In its operation, the overall system keeps the mobile satellite switching centre whereat the user terminal is listed as a visitor as the gateway into and out of the terrestrial system and, if it becomes necessary to employ a different earth station to communicate with the user terminal, signals between earth stations and receives voice messages from their associated mobile satellite switching centres so that, even though a different earth station is conducting the communication, the mobile satellite switching centre whereat the user terminal is registered as a visitor remains the sole gateway into the terrestrial system.

When seeking to contact the user terminal, the mobile satellite switching centre whereat the user terminal is registered as a visitor uses various techniques, including geographical location, estimation of geographical location, and surrounding area coverage to select, if required, an alternative earth station to contact the user terminal.

BRIEF DESCRIPTION OF THE DRAWINGS

The present invention is further explained, by way of an example, by the following description, read in conjunction with the appended drawings, in which.

DESCRIPTION OF EMBODIMENTS

Figure 1:
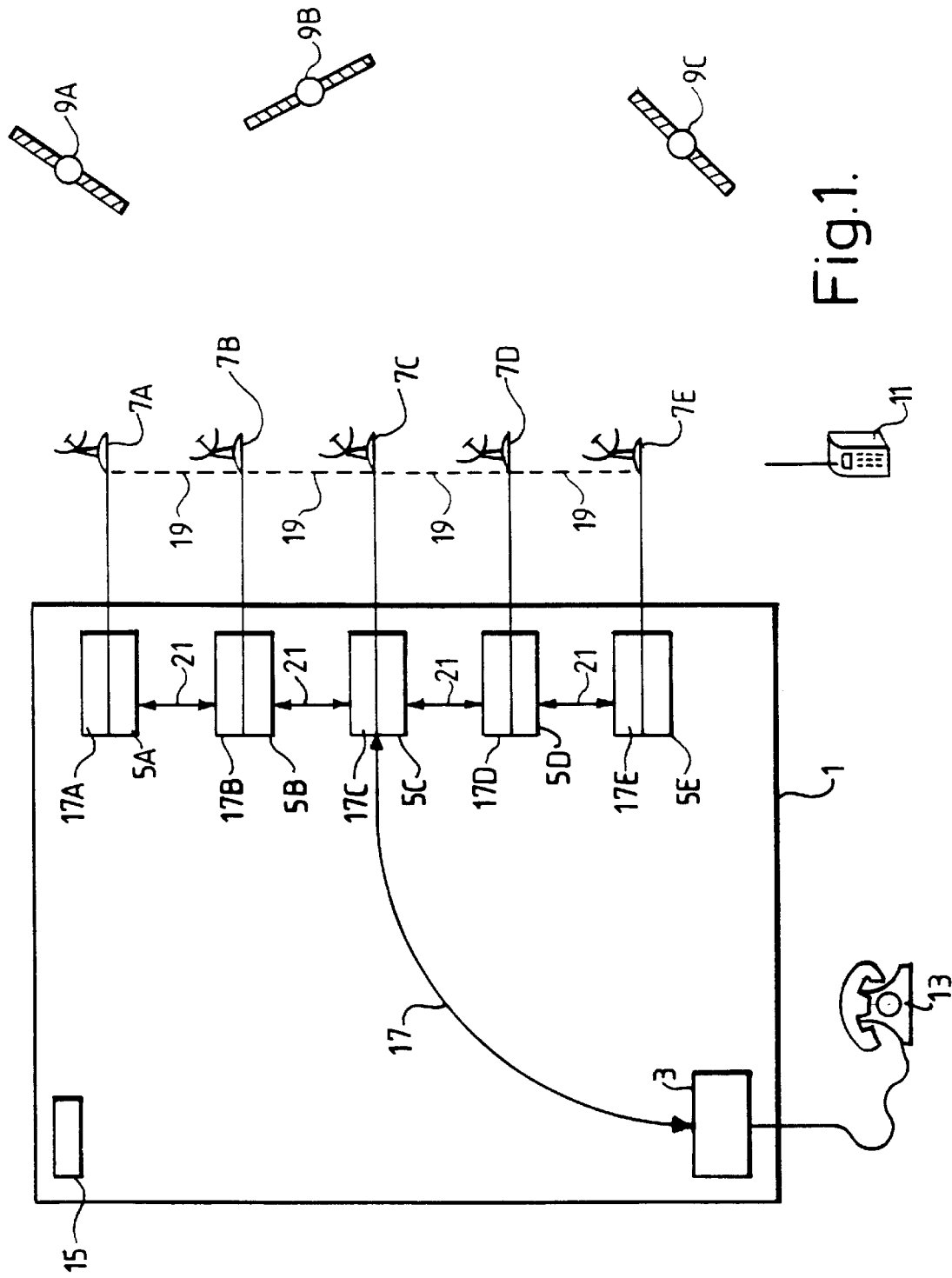
FIG. 1 is a highly schematised representation of the global communications system within which the present invention is comprised.

Attention is drawn to FIG. 1. The terrestrial system 1 comprises a plurality of gateways 3 which may be individual national public or cellular telephone systems, public data switched data networks, public land mobile systems, other satellite systems, and so on. Included in the gateways are a number of mobile satellite switching centres 5A 5B 5C 5D 5E. Each mobile satellite switching centre 5A–E is uniquely connected to one, and only one, earth station 7A 7B 7C 7D. The earth stations 7A–E are scattered about the world. They are designed to interact with a constellation of satellites 9A 9B 9C, in two orthogonal orbits, with ten operational satellites in each orbit with two spares, each orbit at 45 degrees to the equator and at a height of 10,500 km from the surface of the earth. This is only an example of one satellite system with which the present invention would work. As will become apparent to those skilled in the art upon reading the following description and claims, the invention is applicable to virtually any satellite system where a multiple gateway problem arises.

Each of the earth stations 7A–E can communicate with any of the satellites 9A–C which may be within its line of sight. At any one time, different satellites 9A–C may be in the line of sight of different earth stations 7A–E. Some satellites 9A–E may be visible to more than one earth station 7A–E.

A user terminal 11, otherwise unconnected to the terrestrial system 1 because it is remote or does not have the ability so to connect, is able to exchange radio signals with any of the satellites 9A–C which may be in its line of sight and sufficiently elevated above the horizon for communication to be established and maintained. The user terminal 11 is generally in the form of a portable radio telephone handset, not unlike a cellular radio telephone handset, but adapted to function with satellites 9A–C. Now, a satellite 9A–C, visible to the user terminal 11, may, in turn, be visible to more than one earth station 7A–E. Likewise, more than one satellite 9A–C may simultaneously be visible to the user terminal 11 so that a user terminal 11, potentially, may be in simultaneous contact with multiple earth stations 5A–E.

When a subscriber 13 wishes to call the user terminal 11 the terrestrial system 1, recognising the unique identifier of the user terminal 11, is referred to a home location register 15, located within the terrestrial system 1. The home location register 15 is the normal register whereat the details of the user terminals 11 are stored, and may, physically, be located proximate to the point where the user terminal 11 is generally located. For the purpose of this example, it is assumed that the user terminal 11 has moved, and is no longer in its usual location.

At some point, the user terminal 11 has logged on to a satellite and has thus engaged one of the Mobile Satellite Switching Centres 5A 5B 5C 5D. This is its visitor location. Each Mobile satellite Switching Centre 5A–E comprises a corresponding Visitor Location Register 17A–E. When the User terminal 11 is logged on to the terrestrial system 1 via the earth station 7A–E to which it selected access and, in turn, onto its corresponding gateway, which, in this instance, is the related Mobile Satellite Switching Centre 5A–E, a message is sent through the terrestrial system 1 so that the identity of the particular gateway 5A–E wherethrough the user terminal 11 might be found, is stored in the home location register 15. When the subscriber 13 attempts to call the user terminal 11, reference is first made to the home location register 15. The home location register 15 now holds the identity of the gateway 5A–E wherethrough the user terminal 11 is to be found. The audio signal, from the subscriber and via the subscriber's gateway 3, is routed directly to the visitor location (let us say 5C) whereat the user terminal 11 is registered.

As a result of the operation of the terrestrial system 1, the subscriber 13 is directly connected, via the subscriber's gateway 3, for two way voice communication, as indicated by the arrow 17, to the relevant Mobile Satellite Switching Centre 5C, whereat the user terminal 11 happens to be registered as a "Visitor Location."

Now, so far, everything, as described, is perfectly normal, so far as the terrestrial system 1 is concerned. A subscriber 13 has gone through their related gateway 3 to access another gateway 5C for establishment of two way communications. From now on, things become a little more complicated because the user terminal 11 happens to be connected via an earth station 5C whereat the connection via the relevant satellite 9A–C is a transient possibility and whereat the possibility of any form of satellite connection between the user terminal 11 and the earth station 5C whereat the visitor location information 17C happens to be stored is, at best, uncertain, At any moment, the earth station 5A–C could change from the visitor location earth station 5C to one of the others 5A 5B 5D 5E. This is because satellites are constantly changing their position with respect to the user terminal 11 and with respect to the earth stations 5A–E. Conditions can change, making the location of the best positioned earth station 7A–E a matter of some uncertainty.

Each of the earth stations 7A–E is linked to every other earth station 7A–E by a low capacity digital link 19 capable of passing instructions and responses between the earth stations 7A–E but of insufficient capacity to carry voice signals.

Each Mobile Satellite Switching Centre 5A–E is linked, via the terrestrial network 1, to every other Mobile Satellite Switching Centre 5A–E by a voice link 21 capable of two way voice grade communication.

The digital link 19 is a simple packet network and it is envisaged that this can be a permanent connection. Alternatively, it can consist in leased or borrowed time slots in systems comprising part of the terrestrial system.

The voice link 21 is an expensive item to create and to run. It is to be recalled that the earth stations 7A–E may be many thousands of kilometres apart and more than likely separated by oceans. Thus, the associated Mobile Satellite Switching Centres 5A–5E are similarly separated. While it is within the scope of the present invention that the voice link 21 can be a permanent, dedicated voice grade channel or channels, it is preferred that the voice link 21 is a line, already existing within the terrestrial network and which can be called upon when required. For example, when one Mobile Satellite Switching Centre 5C wishes to call another 5E, being itself a gateway, the one Mobile Satellite Switching Centre 5C simply places a call through the terrestrial system 1 to the other 5E and establishes the voice link 21 that way. This example is not intended to be restrictive, and those, skilled in the art, will be aware of numerous other ways in which the voice link 21 can be created.

Figure 2:
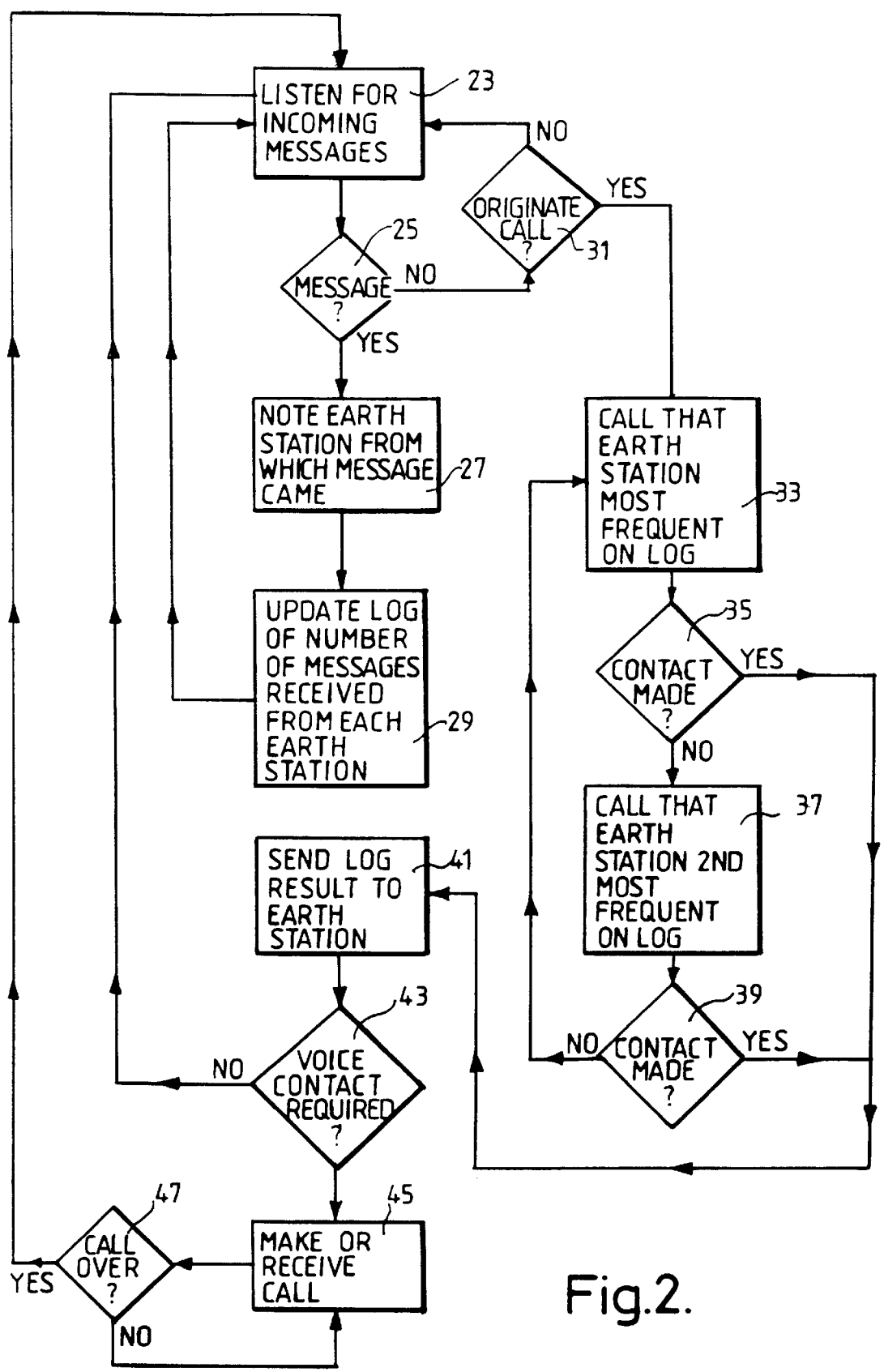
FIG. 2 is a flow chart of the activities of the user terminal when interacting with the system of FIG. 1.

FIG. 2 is a flowchart of the behaviour of the user terminal 11.

Even when not functional in the ordinary sense, the user terminal 11 is active and monitoring incoming messages. Each of the satellites 9A–C puts out constant general messages for the information and instruction of whatever user terminals 11 can hear them. In a first activity 23, the user terminal 11 hears the messages, broadcast from the satellites 9A–C. These messages contain information concerning with which earth station 7A–E the particular satellite is in contact. If a first test 25 detects a general message from a satellite 9A–C, control is passed to a second activity 27 where the information is extracted concerning from which earth station 7A–E the message originated. Control then passes to a third activity which updates a running log of the number of general messages received from each earth station.

The log keeps a record of the number of messages, received in a predetermined time, from each earth station 7A–C which can be heard. The log thus represents a measure of the relative accessibility of each earth station 7A–C. The predetermined period can be as long as a day or as short as a few minutes, depending upon the service required. For example, if the user terminal is in a slow moving vehicle such as a sailing boat or a land vehicle in a desert, the rate of change of position is relatively slow so that a log, kept over a day, will contain valid information about the most easily accessible earth station 7A–C. On the other hand, if the user terminal is in a fast vehicle, such as an aircraft or a low orbiting space vehicle, the rate of change of position is very fast so that a log lasting over just a few minutes will give the best information.

Control is passed from the third activity 29 back to the first activity 23 where the user terminal 11 continues to monitor messages from the satellites 9A–C.

If the first test 25 detects no message, a second test 31 looks for any necessary call making activity which may be required. If no call making activity is required, control is passed back to the first activity 23 where the user terminal 11 continues to monitor messages from the satellites 9A–C.

If the second test 31 detects a call making requirement, control is passed to a 4th Activity 33.

The call making requirement may come from various sources. The user terminal 11 is required, after a predetermined lapse of time, to call into the satellite system to "log on" to confirm its presence and, by means outside the boundaries of the present invention, to indicate its approximate location on the surface of the earth. Equally, the owner of the user terminal 11 may wish to make a telephone call. Similarly, an earth station 7A–C may have paged the user terminal 11 and require a response. This list is merely representative and not exhaustive of the various reasons the user terminal 11 may wish to originate a call.

The fourth activity 33 looks up the log, selects that earth station 7A–E which has the most log entries, and causes the user terminal 11 to page that earth station 7A–E. A third test 35 monitors whether or not the called earth station responds. If no response is received, control is passed to a fifth activity 37 which causes the user terminal 11 to attempt to page that earth station with the second largest number of entries in the log. If a fourth test 39 does not detect that contact has been made, control can be passed back to the fourth activity 33 to attempt, once more, to page the most likely earth station 7A–E. Not shown in the flow chart, but implicit from this example, is the possibility of going right down the list of earth stations 7A–E in the log until one is found that responds. Also not shown, but also implicit, is the possibility that the fourth test 39, or its equivalent depending on how may earth stations 7A–E on the log are paged, simply terminates the attempt to raise an earth station 7A–E and passes control back to the first activity 23, or passes control back to the first activity 23 after a predetermined number of attempts to raise different earth stations 7A–E.

In the above manner, the user terminal 11 gains access to the terrestrial system 1 via the satellites 9A–C and the earth stations 7A–E in the most expeditious manner possible and with the highest probability of a successful connection.

When contact is made, a sixth activity 41 sends, among other information which is of no concern to this invention, details of the log to that earth station 7A–E with which contact is made. If no voice contact is required (i.e. the user terminal 11 is not required to make or receive a call), a fifth test 43 passes control back to the first activity 23. If voice contact is required, a seventh activity 45 makes or receives the call until a sixth test 47 detects that the call is over and passes control back to the first activity 23.

Now, if the call was originated from the user terminal 11, the Mobile Satellite Switching Centre 5A–E associated with the earth station 7A–E which received the contact from the user terminal becomes the visitor location of that user terminal and details of the particular user terminal 11 are transferred from the home location register 15 in the terrestrial system 1 into the visitor location register 17A–E in the appropriate Mobile Satellite Switching Centre 5A–E. Under the terms of the present invention, the log details, transferred in the sixth activity 41 to the earth station 7A–E, are also stored in association with the details held in the visitor location register 17A–E.

Figure 3:
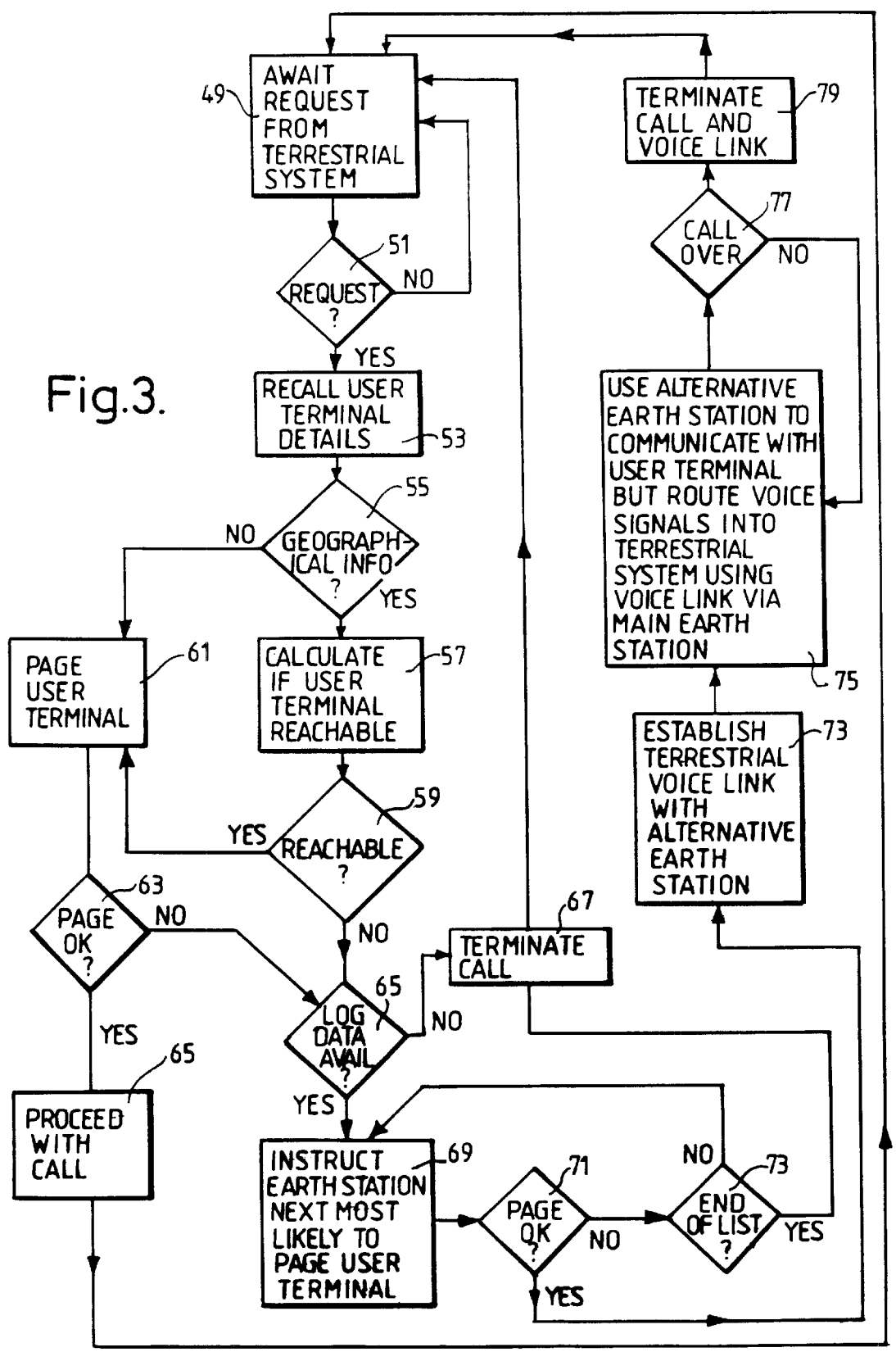
FIG. 3 is a flow chart of the activities of the main Mobile Satellite Switching Centre of FIG. 1.

FIG. 3 is a flowchart of the activities of the Mobile Satellite Switching Centre (chosen in this instance, per FIG. 1, to be 5C) whereat the user terminal 11 has been registered as a visitor location (17C).

An eighth activity 49 awaits a request from the terrestrial system 1 until a seventh test 51 detects such a request, whereupon control is passed to a ninth activity 53 which recalls the details of the particular user terminal it is desired to access from the visitor location register 17C and its associated memories.

An eighth test 55 checks the associated data to see if a geographical location is stored. This data, as was earlier described, is derived from a prior knowledge of the position of the satellites 9A–C, doppler frequency shift measurements and measurement of signal path delays to determine the location of the user terminal to within some 50 meters on the surface of the earth. If such a location is stored, control is passed to a tenth activity 57 where it is calculated whether or not, given the instant disposition of the satellites 9A–E, the user terminal 11 can contact the earth station 7C whereat it is registered as a visitor from its last recorded location. If a ninth test 59 confirms that the user terminal 11 can, at that instant, be reached, control is passed to an eleventh activity 61 which causes the user terminal 11 to be paged. If the user terminal 11 is successfully paged, a tenth test 63 passes control to a twelfth activity 65 which allows the call to the user terminal 11 to proceed and passes control back to the eighth activity 49 on call completion.

If the eighth test 55 detected no geographical details, it is still a fair bet that the particular earth station 7C whereat the user terminal 11 is listed as a visitor is the most likely earth station 7C to reach it. Accordingly, the eighth test 55, if no geographical data is available, passes control to the eleventh activity 61 which pages the user terminal in any event and proceeds with the call if successful.

If the attempt to page the user terminal 11 has failed, or if the user terminal 11 has been deemed unreachable by the ninth test 59, an eleventh test 65 checks to see if the details of the log, generated by the user terminal in the third activity 29 and sent, at last access, by the sixth activity 41, to the earth station 17C, are present. If no log data is available, the eleventh test 65 passes control to a twelfth activity 67 which terminates the attempted contact with the user terminal 11 and passes control back to the eighth activity 49 where the Mobile Satellite Switching Centre 17C awaits a further approach from the terrestrial system 1.

If the eleventh test 65 detects the presence of the log data from the user terminal 11, it passes control to a thirteenth activity 69 which causes the user terminal 11 to be addressed from another earth station 7A–E.

Let us say, for the sake of example, that the user terminal had heard 25 calls from a first earth station 7B, 50 calls from a second earth station 7C and 10 calls from a third earth station 7D. Now the earth station 7C 5C whereat the user terminal 11 is registered as a visitor is clearly unable to make contact. Accordingly, the thirteenth activity 69 selects the next most likely earth station 7B, with 25 calls in the log, to address the user terminal 11.

The Mobile Satellite Switching Centre 5C, whereat the user terminal is registered as a visitor, becomes a hub and maintains access to the terrestrial network 1 as the gateway for the user terminal 11 despite the user terminal 11 being addressed by a different earth station 7B.

Firstly, the second earth station 7C sends a message via the data link 19 to the first earth station 7B commanding the first earth station 7B to page the user terminal 11. The first earth station 7B attempts the page and reports back to the second earth station 7C whether or not the paging attempt was successful. If a twelfth test 71 detects that the paging attempt was unsuccessful, and a thirteenth test 73 detects that there are still other earth stations audible to the user terminal 11, control is passed back to the thirteenth activity 69 where the next most likely earth station 7D is selected.

For the sake of this example, let us imagine that the paging attempt from the third earth station 7D has succeeded. The twelfth test 71 passes control to a fourteenth activity 73 where the Mobile Satellite Switching Centre 5C at the second earth station 7C establishes the voice link 21 to the Mobile Satellite Switching Centre 5D at the third earth station 7D. This has earlier been described. Control is then passed to a fifteenth activity 75 where the third earth station 7D actually communicates with the user terminal 11, but the voice message and any other data for the terrestrial system 1 are passed via the voice link 21 to enter the terrestrial system 1 via the Mobile Satellite Switching Centre 5C at the second earth station 7C.

When a thirteenth test 77 detects that the call is over, control is passed to a sixteenth activity 79 where the third earth station 7D is instructed to terminate its contact with the user terminal 11, the mobile satellite switching centre 5C at the second earth station 7C disconnects the voice link 21 between itself and the mobile satellite switching centre 5D at the third earth station 7D, and the mobile satellite switching centre 5C at the second earth station 7C disconnects from the terrestrial network 1. Control then passes back to the eighth activity 49 where the mobile satellite switching centre 5C at the second earth station 7C awaits requests from the terrestrial system 1.

Had the log from the user terminal 11 been otherwise than as in the example given, the thirteenth activity 69 would simply have gone down the list of earth stations 7A–E in descending order of their probability of accessibility to the user terminal 11 as reflected by the number of entries against each one in the log, until one was found that could execute a successful page of the user terminal 11.

The twelfth activity 67 can also have another variant where log information is not available. Instead of simply terminating the call, in the twelfth activity 67 the mobile satellite switching centre 5C at the second earth station 7C uses the digital link 19 to instruct other earth stations 7C, in the geographic vicinity of where the user terminal 11 was believed to be, or simply surrounding the second earth station 7C, to see if a successful page could be executed. If a page succeeds, the contact is made via the other earth station 7A–E as described above. If a successful page is not possible, the call is terminated.

As an example of this last variant, if a user terminal is believed to be somewhere in the Caribbean, but cannot be paged from a North American earth station 7 where its visitor location is stored, because of its location the user terminal might be accessible from earth stations 7 in South America or Africa. Accordingly, the North American earth station 7 causes the African and South American earth stations 7 to attempt to page the user terminal 11.

If no information is available concerning the likely location of the user terminal 11, its visitor location earth station 7 in North America commands not only the South American and African earth stations 7 to attempt to page the user terminal 11, but also in Europe, the Pacific Rim and the polar region. In this way the earth station 7 whereat the user terminal has its visitor location does its best to complete the ring around itself so that, no matter in which direction the user terminal 11 may have escaped, it can be found.

A variant exists for the tenth activity 57. Instead of simply taking the last known geographical location of the user terminal 11, the times and locations of the user terminal 11 on a previous plurality of accesses are used to plot, for example, a speed and direction for the user terminal 11 which would be of great utility if the user terminal were on a rapidly moving transport such as a jet aircraft or a low orbiting spacecraft. An estimate of the present location can then be made when calculating whether or not the user terminal 11 is accessible and the appropriate earth station 7 closest to the estimated location instructed to page the user terminal 11.

The user terminal 11 generally comprises a subscriber identity module (known as a SIM) which is provided in the form of a smartcard comprising memory and a microprocessor, all of which can be inserted into the body of the user terminal. In this embodiment, it is preferred that the activities of the user terminal are comprised within the overall action of the smartcard, being additions to the overall controlling software. Those, skilled in the art, will be aware that there are many other ways in which the user terminal 11 can be caused to behave as hereinbefore described.

Equally, in this embodiment of the invention, it is preferred that the overall activity of the mobile satellite switching centres be comprised as an addition to the data processing activity which already exists therein. Those, skilled in the art, will be aware of numerous other ways in which the mobile satellite switching centres can be caused to behave as hereinbefore described.

What is claimed is:

1. A communication system wherein a user terminal can communicate with a plurality of satellites; wherein each of said plurality of satellites can communicate with a plurality of earth stations; wherein each of said plurality of earth stations is operable to provide a gateway into a terrestrial communication system; and wherein said user terminal is registered at a selected one of said plurality of earth stations as its gateway station; wherein said gateway station, in the event of being unable to establish contact with said user terminal, is operative to select and instruct another earth station to establish contact with said user terminal to act as an alternative earth station and being further operative to pass messages to and from said user terminal through said alternative earth station while said GW station acts as the only gateway into said terrestrial communication system.

2. A communication system, according to claim 1, wherein said gateway earth station is operative to employ a low capacity data link to instruct said alternative earth station to attempt to establish contact with said user terminal and, in the event of said alternative earth station establishing contact with said user terminal, is operative thereafter to employ a high capacity voice link to pass messages to and to receive messages from said alternative earth station.

3. A communication system according to claim 1 wherein said gateway earth station is operative to recall the last known geographical location of said user terminal and is further operative to select, as said alternative earth station, that earth station most likely to establish contact with a user terminal at said last known geographical location.

4. A communication system according to claim 1 wherein said gateway earth station is operative to recall and employ a plurality of timed previous geographical locations for said user terminal to estimate the instant position of said user terminal and is further operative to select, as said alternative earth station, that earth station most likely to establish contact with said user terminal at said estimated instant position.

5. A communication system according to claim 1 wherein said gateway earth station, in the event of being incapable of establishing contact with said user terminal, is operative to select in turn, as said alternative earth station, each of those earth stations which are geographically most proximate to said gateway earth station until an alternative earth station is found capable of establishing contact with said user terminal.

6. A communication system according to claim 1 wherein said gateway earth station is operative to execute a calculation to determine whether or not said gateway earth station is capable of establishing contact with said user terminal and to select said another earth station as said alternative earth station if and only if said calculation indicates that said gateway earth station is incapable of establishing contact with said user terminal.

7. A method for establishing communication with a user terminal for use in a communication system wherein a user terminal can communicate with a plurality of satellites; wherein each of said plurality of satellites can communicate with a plurality of earth stations; wherein each of said plurality of earth satellites is operable to provide a gateway into a terrestrial communication system; and wherein said user terminal is registered at a selected one of said plurality of earth stations as its gateway station; said method comprising the steps of said gateway station, in the event of being unable to establish contact with said user terminal, selecting and instructing another earth station to establish contact with said user terminal to act as an alternative earth station and said gateway station passing messages to and from said user terminal through said alternative earth station while acting as said gateway into said terrestrial communication system.

8. A method according to claim 7, including the steps of said gateway earth station employing a low capacity data link to instruct said alternative earth station to attempt to establish contact with said user terminal and, in the event of said alternative earth station establishing contact with said user terminal, employing thereafter a high capacity voice link to pass messages to and to receive messages from said alternative earth station.

9. A method according to claim 7 including the steps of said gateway earth station recalling the last known geographical location of said user terminal and selecting, as said alternative earth station, that earth station most likely to establish contact with a user terminal at said last known geographical location.

10. A method according to claim 7 including the steps of said gateway earth station recalling and employing a plurality of timed previous geographical locations for said user terminal to estimate the instant position of said user terminal and, thereafter, selecting, as said alternative earth station, that earth station most likely to establish contact with said user terminal at said estimated instant position.

11. A method according to claim 7 including the steps of said gateway earth station, in the event of being incapable of establishing contact with said user terminal, selecting, in turn, as said alternative earth station, each of those earth stations which are geographically most proximate to said gateway earth station until an alternative earth station is found capable of establishing contact with said user terminal.

12. A method according to claim 7 including the steps of said gateway earth station executing a calculation to determine whether or not said gateway earth station is capable of establishing contact with said user terminal, and selecting said another earth station as said alternative earth station if and only if said calculation indicates that said gateway earth station is incapable of establishing contact with said user terminal.

\* \* \* \* \*